US008259666B2

(12) United States Patent
Bao et al.

(10) Patent No.: US 8,259,666 B2
(45) Date of Patent: Sep. 4, 2012

(54) FEMTO-BTS RF ACCESS MECHANISM (75) Inventors: Derek Hongwei Bao, Concord, CA (US); David Chiang, Fremont, CA (US)

(73) Assignee: Cellco Partnership, Basking Ridge, NJ (US)

( * ) Notice: Subject to any disclaimer, the term of this patent is extended or adjusted under 35 U.S.C. 154(b) by 0 days.

(21) Appl. No.: 13/345,465

(22) Filed: Jan. 6, 2012

(65) Prior Publication Data
US 2012/0108234 A1 May 3, 2012

Related U.S. Application Data (62) Division of application No. 11/892,330, filed on Aug. 22, 2007, now Pat. No. 8,121,089.

(51) Int. Cl.
*H04W 4/00* (2009.01)
(52) U.S. Cl. ...... 370/329; 370/331; 455/444; 455/435.1
(58) Field of Classification Search .......... 370/329–333; 455/432.1, 435.1, 436, 444, 411, 522, 403
See application file for complete search history.

(56) References Cited

U.S. PATENT DOCUMENTS

| 5,513,184 | A | 4/1996 | Vannucci |
| 5,790,952 | A | 8/1998 | Seazholtz et al. |
| 5,864,549 | A | 1/1999 | Honkasalo et al. |
| 5,974,308 | A | 10/1999 | Vedel |
| 6,101,176 | A | 8/2000 | Hankasalo et al. |
| 6,970,719 | B1 * | 11/2005 | McConnell et al. ....... 455/554.1 |
| 7,398,087 | B1 * | 7/2008 | McConnell et al. ....... 455/435.1 |
| 7,613,444 | B2 | 11/2009 | Lindqvist et al. |
| 8,150,392 | B1 * | 4/2012 | McConnell et al. ....... 455/432.1 |
| 2002/0032034 | A1 | 3/2002 | Tiedemann, Jr. et al. |
| 2002/0151308 | A1 | 10/2002 | Baba et al. |
| 2003/0109257 | A1 | 6/2003 | Nilsson et al. |
| 2003/0148774 | A1 | 8/2003 | Naghian et al. |
| 2003/0231586 | A1 | 12/2003 | Chheda |
| 2004/0204097 | A1 | 10/2004 | Scheinert et al. |

(Continued)

FOREIGN PATENT DOCUMENTS

EP 1 099 357 B1 12/2006

OTHER PUBLICATIONS

"WCDMA Ubicell Benefits," http://www.samsungnetwork.com, retrieved Jul. 18, 2007.

(Continued)

*Primary Examiner* — Ayaz Sheikh
*Assistant Examiner* — Mounir Moutaouakil (57) ABSTRACT

Femto cells that extend mobile network coverage into customer premises operate in a frequency band typically assigned to a macro network. To facilitate system discovery and registrations of mobile stations with femto cells, a carrier designates one the channels within the band as a primary channel for its femto cells. For example, neighbor list messages transmitted by macro network base stations can provide frequency and PN code information directing mobile stations to search the primary channel for a PN code of the femto cells. The mobile station preferred roaming list (PRL) may identify femto cells by SID/NID. The SID is that of the carrier's macro network, whereas the NID may be a NID of the macro network or one specifically assigned to femto cell operations. The PRL uses frequency acquisition information for the femto cells that is the same as or similar to that for one of the macro networks.

12 Claims, 4 Drawing Sheets

U.S. PATENT DOCUMENTS

| | | | |
|---|---|---|---|
| 2005/0059390 | A1 | 3/2005 | Sayers et al. |
| 2006/0111110 | A1 | 5/2006 | Schwarz et al. |
| 2006/0160565 | A1 | 7/2006 | Singh et al. |
| 2006/0215609 | A1 | 9/2006 | Kyung et al. |
| 2007/0155421 | A1 | 7/2007 | Alberth et al. |
| 2008/0009286 | A1 | 1/2008 | Hur et al. |
| 2008/0095100 | A1* | 4/2008 | Cleveland et al. ............ 370/328 |
| 2008/0132239 | A1* | 6/2008 | Khetawat et al. ............. 455/438 |
| 2008/0232487 | A1* | 9/2008 | Cleveland et al. ............ 375/260 |
| 2008/0305801 | A1 | 12/2008 | Burgess et al. |
| 2009/0042596 | A1 | 2/2009 | Yavuz et al. |
| 2009/0046632 | A1* | 2/2009 | Nanda et al. .................. 370/328 |
| 2009/0047931 | A1* | 2/2009 | Nanda et al. .................. 455/411 |

OTHER PUBLICATIONS

Thadasina, "CDMA2000 1X Femtocell Challenges Associated w/Underlay Deployments," CDG Technology Forum, Dallas, Texas, May 2, 2007.

Yomogita, "Korean Samsung, NEC and Others Present 'Femto Cells'," Tech-On, Feb. 21, 2007, Nikkei Electronics.

"Femto Cells: Personal Base Stations," Airvana, Chelmsford, MA.

"Samsung Introduces CDMA Base Station for Home Coverage at CTIA," Samsung Telecommunications America, LLC, Mar. 26, 2007.

"Your own mobile base station for home," inbabble.com, Feb. 10, 2007.

Entire Prosecution of U.S. Appl. No. 11/892,330 to Derek Hongwei Bao et al. filed Aug. 22, 2007, entitled, "Femto-BTS RF Access Mechanism."

U.S. Appl. No. 11/896,160, Chen, Xuming et al., "Pico cell home mode operation," filed Aug. 30, 2007.

U.S. Appl. No. 11/896,355, Bao, Derek Hongwei et al., "Active service redirection for a private femto cell," filed Aug. 31, 2007.

International Search Report and the Written Opinion of the International Searching Authority issued in International Patent Application No. PCT/US2008/072871 dated on Nov. 14, 2008.

International Search Report and the Written Opinion of the International Searching Authority issued in International Patent Application No. PCT/US2008/072882 dated on Nov. 5, 2008.

International Search Report and the Written Opinion of the International Searching Authority issued in International Patent Application No. PCT/US2008/072886 dated on Nov. 5, 2008.

Thadasina, Nivi, "CDMA2000 1X Femtocell Challenges Associated w/ Underlay Deployments," CDG Technology Forum, Dallas, Texas, May 2, 2007.

\* cited by examiner

FIG. 1

Broadcasted by all cells in Macro Network

| Field | Input |
|---|---|
| NGHBR SRCH MODE | Setting search priorities and windows |
| NUM NGHBR | Set to 1 for the IP-BTS |
| NGHBR PN | Primary PN of the IP-BTS |
| SEARCH PRIORITY | Set to LOW or MED |
| NGHBR BAND | Set to the IP-BTS operating band |
| NGHBR FREQ | Set to the IP-BTS primary operating channel |

*FIG. 4*

Broadcasted by IP-BTS

| Field | Input |
|---|---|
| NGHBR SRCH MODE | Setting search priorities and windows |
| NUM NGHBR | Set to # physical neighbors in macro network |
| NGHBR PN | Corresponding neighbor PN's |
| SEARCH PRIORITY | Set to MED or HIGH |
| NGHBR BAND | Set to the macro network primary operating band |
| NGHBR FREQ | Set to the macro network primary operating channel |

FEMTO-BTS RF ACCESS MECHANISM

CROSS-REFERENCE TO RELATED APPLICATION

The present application is a divisional of and claims the benefit of U.S. application Ser. No. 11/892,330 which was filed on Aug. 22, 2007, the disclosure of which is incorporated by reference herein in its entirety.

BACKGROUND

In recent years, use of mobile communications devices for voice telephone services, email or text messaging services and even multi-media service has become commonplace, among mobile professionals and throughout the more general consumer population. Mobile service provided through public cellular or PCS (personal communication service) type networks, particularly for voice telephone service, has become virtually ubiquitous across much of the world. In the USA, for example, competing public networks today provide mobile communications services covering most if not all of the geographic area of the country.

In addition to public networks, similar wireless technologies have provided relatively small scale networks for enterprise applications, typically offering wireless service analogous to private branch exchange (PBX) type service. Such a smaller scale private system includes several base stations, similar to but scaled down from those used in the public networks, in combination with a private circuit switch or more recently an Internet Protocol (IP) router or network, for providing communications between devices and with external networks. U.S. Pat. No. 6,970,719 to McConnell et al. and U.S. application publication no. 2005/0059390 to Sayers et al. disclose examples of such private wireless cell phone networks. Although sometimes referred to as an "indoor cellular network" or "indoor system," such enterprise systems need not be literally indoors and for example may offer coverage across an entire campus area. Alternatively, such an enterprise cellular communication system may be referred to as a "pico-cell" system, with the outdoor public cellular communication system covering a wider area being referred to as a "macro-cell" system.

As broadband IP connectivity to homes and offices has become more common, and the speeds of packet-switched communications equipment and the speed of processors have increased, a variety of applications have emerged that utilize IP packet transport as an alternative bearer for voice communications. Generally, such applications are referred to as voice-over-packet services, however, the common forms based on Internet Protocol (IP) are referred to as "Voice over IP" or "VoIP" services. Although originally developed for wireline network transport through the Internet and through wireline intranets, VoIP services are now migrating to the wireless domain. Pico cell systems, which use IP routing or frame switching for IP transport, utilize VoIP technology to support the voice services.

As an extension of these developments/deployments into the customer premises, particularly for residential or small business applications, equipment manufacturers have recently begun offering "femto" cell devices, e.g. for home installation. A "femto" cell system is a base transceiver system (BTS) forming a compact base station. In most recent examples, such compact base stations are equipped with VoIP capability and an IP interface, for example, for connection to a digital subscriber line (DSL) modem or to a cable modem. One such unit in a home or small business, for example, would allow mobile station users in the premises to make and receive calls via the existing broadband wireline service from the customer's Internet Service Provider (ISP), without consuming air-time minutes for wireless service that otherwise would use their public carrier's network.

It has been suggested that the deployment of femto cells will be particularly advantageous to a carrier as a way to improve service of the carrier's macro network in customer premises locations where the macro network service is less than optimum. For example, if a mobile station user may have weak coverage at his or her residence, installation of femto BTS in the home effectively extends macro network coverage into the home in a manner that substantially improves the customer's experience using the carrier's network.

At present, plans therefore are for the carrier(s) to distribute (sell or lease) the femto cell equipment to their public network customers. The femto cell is intended to work with a regular mobile station. To the mobile station, the BTS of such a femto cell appears like a normal base station of the public network. Deployment of femto cells, particularly in large numbers of customer premises, requires coordination with networks of the applicable public carriers, which raises issues for such a carrier.

Femto BTS devices are strategic products to allow a carrier to enhance network coverage by providing cellular coverage inside the customer premises, which are designed to be deployed and redeployed at any time. Despite its size, the femto BTS has almost all the salient features of a macro BTS and raises similar concerns regarding configuration for radio frequency (RF) operation. If treated in a manner analogous to introducing a new macro BTS into a network, comprehensive provisioning would be needed with respect to each new or redeployed femto cell. Some of the key RF parameters that would need to be provisioned are: RF channel assignment; PN assignment; Power; Updating the neighbor lists of all neighboring macro and femto BTS's, femto cell identifications such as SID/NID information, etc. Imagine introducing customer premises femto BTS products where the quantity, location, time of introduction are all indeterminate and can change at any time—the effort on the network engineers' part to provision these devices and to provision aspects of the macro network in relation to these devices would be enormous.

Provisioning of the femto cell and surrounding network in the same manner as for new macro cells therefore is not practical. However, the femto cell equipment does need to be configured, and the mobile stations do need to have sufficient knowledge of the femto cell configuration to allow the mobile stations to effectively access the femto cells. As a commercial matter, the service provided to the customer should appear seamless—virtually no different when receiving service through the femto cell than when receiving service through a macro cell BTS. The femto BTS devices operate as an underlay system to the macro network. For customers to widely accept such an underlay network the mobile stations should be able to move between the macro network and these devices seamlessly. Since the CDMA femto BTS is a new product in development, there is currently no known working deployment method within a macro network that addresses such provisioning or seamless service needs.

Hence, a strategy to permit seamless access to the femto cells for macro network mobile stations is needed that allows for a simple flexible deployment, with as much standardized configuration of the BTS equipment as possible, so as to not require extensive individualized provisioning in relation to each femto BTS.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, the present teachings may be practiced without such details. In other instances, well known methods, procedures, components, and circuitry have been described at a relatively high-level, without detail, in order to avoid unnecessarily obscuring aspects of the present teachings.

The examples provide an improved strategy for mobile station access to femto cells, which results in a relatively seamless operation for a carrier's mobile stations that can operate in the carrier's macro network and through femto cells as may be deployed at premises of customers of the carrier. The femto cells will use a frequency band, typically one normally used by a macro network although not necessarily the band that the carrier's macro network uses in the particular area. One of the channels available for femto cell communication within that band is designated as a primary channel. Mobile station operations, such as those for system discovery and/or handoff registrations, can then be pointed towards the femto cells in a simple fashion based on knowledge of the one primary channel and of parameters of femto cell operation on that channel. In the example, frequency and system identification information for the femto cells is included in the PRL used by the carrier's mobile stations for network discovery, e.g. to facilitate initial registration operations upon mobile station power-up or when searching for a new system after loss of system signal at a mobile station. Also, appropriate frequency and PN code information is included in one or more of the neighbor list messages broadcast by the base stations of the carrier's macro network. The mobile station responds to the data in the neighbor list message by searching for femto cells, as part of its routine search for neighboring base stations. When criteria dictates an idle state handoff, e.g. based on relative signal strength, the mobile station can transition to registration through a femto cell, essentially as it would to a neighboring macro base station.

In particular, in a first example, a method or system is provided for enabling a mobile station operable through base stations of a macro wireless communication network operated by a carrier to access one of a plurality of customer premises femto cells. Each femto cell is capable of operating on a selected one or more of a plurality of frequency channels, and each femto cell is configured to provide at least a pilot on one of the frequency channels designated as a primary frequency channel for femto cell communication. A preferred roaming list (PRL) of the carrier is stored in a mobile station, the PRL including one or more entries providing information for use in searching for and selecting a femto cell base transceiver system (BTS) and one or more entries providing information for use in searching for and selecting a macro network base station, in a network discovery operation. The information for use in searching for and selecting a femto cell includes an identification of the primary frequency channel for femto cell communication and system identification information to be used by the BTSs of all femto cell BTSs of the carrier's customers communicating on the primary frequency channel. Upon initiating network discovery, a system is searched for with which to register the mobile station based on the stored PRL, the search including searching for the system identification information on the primary frequency channel. A procedure is initiated to register the mobile station with one of the femto cell BTSs, responsive to the search detecting the system identification information on the primary frequency channel.

In a second example, a method or system is provided for enabling handoff of a mobile station operable through base stations of a macro wireless communication network operated by a carrier to one of a plurality of customer premises femto cells. A transmission of a neighbor list message is received from a base station of the carrier's macro network, the neighbor list message containing information for use in searching at a particular frequency for and selecting a femto cell base transceiver system (BTS). The information for use in searching for and selecting a femto cell includes an identification of a primary frequency channel designated for use by all femto cell BTSs of the carrier's customers in a region served by the carrier's macro network, from among a plurality of channels available for femto cell communication, and a code designated for use by femto cell BTSs of the carrier's customers in the region communicating on the primary frequency channel. A system is searched for with which to register the mobile station for handoff, the search including searching the primary frequency channel for communications of a femto cell BTS using the code. Upon detecting a condition for handoff, a procedure is initiated to register the mobile station with one of the femto cell BTSs, based on the search detecting use of the code on the primary frequency channel.

Figure 1:
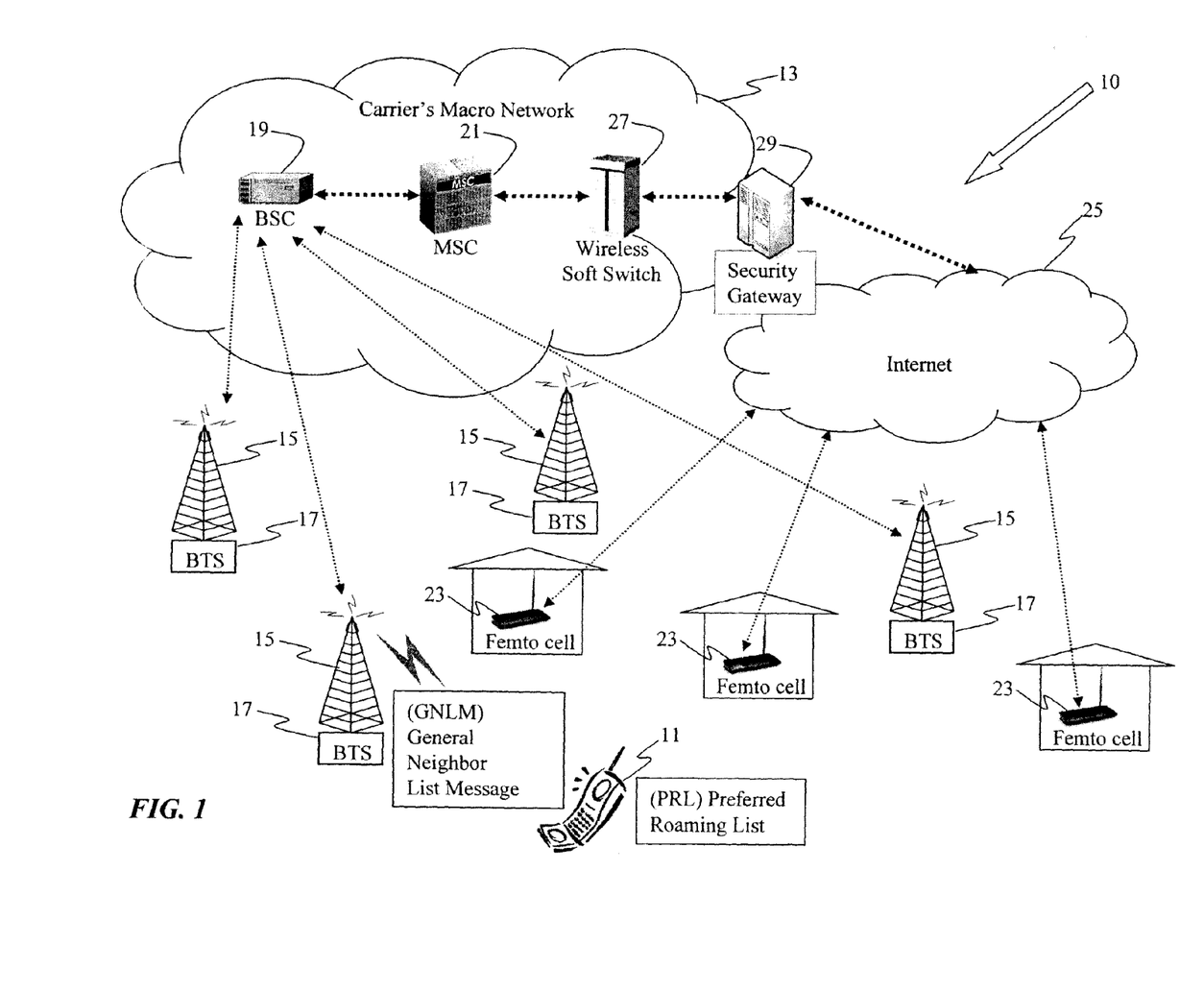
FIG. 1 is a simplified high-level diagram of a mobile communication system, including a macro network and a number of femto cells.

Before discussing the access strategy, it may be helpful to consider a high-level overview of an example of a system that might implement such a femto cell access strategy. FIG. 1 is a functional block diagram of a system 10 for providing wireless communication services for mobile stations 11, using both macro cell public network equipment and femto cell equipment at customer premises locations. In the example, a carrier operates the macro cell network 13 and provides mobile stations 11 to its customers, i.e. so that the mobile station users obtain wireless communication services through the macro network 13. Although the present concepts may be applied to other types of networks, the exemplary network 13 is a CDMA type network. The carrier also supplies femto cell equipment of a corresponding type, CDMA in our example, to some of its customers, for customer premises deployments; and the carrier may also operate some additional equipment (such as a soft switch 27) to support femto cell communications. Hence, in the example, the system associated with or operated by the carrier includes the macro network 13, the customers' mobile stations 11, the femto cells 23 and any of the carrier's equipment that supports the femto cell communications. The carrier's system may utilize or communicate through other networks or systems not owned, operated or affiliated with the carrier or its system(s) or network(s), such as the public switched telephone network (PSTN) or the public Internet.

In many areas today, one or more wireless service providers or carriers operate a macro network 13, to provide wireless mobile communications services over a radio airlink for mobile stations 11. Typically, such a macro network uses a 'cellular' architecture. A carrier providing service throughout the country will operate similar networks in various geographic regions. Based on the regulatory scheme, the carrier's networks in different areas may operate on different frequency bands. In some countries, particularly in the USA, a number of carriers operate two or more such networks and compete for providing services to mobile customers. For convenience, the example shows one such macro network 13, as a carrier might deploy to serve a given geographic region or area.

For discussion purposes, the example shows a limited number of the elements of the carrier's macro network 13. Hence, in the example, the carrier operates a number of base stations 15, a base station controller (BSC) 19 and a mobile switching center (MSC) 21, to provide mobile wireless communication services to mobile stations 11 operating within areas or regions served by the radio coverage of the individual base stations 15. Each base station 15 typically includes an antenna system represented as a tower in the drawing and an associated base transceiver system (BTS) 17. The radio transceivers of the BTS 17 communicate via the antennae of the base station and over the airlink with the mobile stations 11, when the mobile stations are within range.

Today, most versions of the MSC 21 provide circuit switched communications to/from mobile stations 11 and other networks or elements, although newer switching systems are being deployed that utilize packet switching technologies. Each wireless service provider's network typically includes a BSC 19 that controls the functions of a number of base stations 15 and helps to manage how calls made by each mobile station 11 are transferred (or "handed-off") from one serving base station 15 to another and/or to and from the base stations of neighboring systems. Each wireless network equipment vendor implements this function differently. Some vendors have a physical entity, which they call a base station controller like the BSC 19 shown in the drawing, while other vendors include this functionality as part of their switch that forms the MSC 21.

Each service provider's facilities may offer somewhat different services, e.g. voice call, text messaging, data or various combinations of these and other services. Also, the service providers will have different agreements in place as to how to treat each others' subscribers when roaming through the various networks.

In the example, the carrier's macro network 13 offers voice telephone service for and between mobile stations 11. Although not shown, such telephone service also includes voice calls between mobile stations and landline telephones through the PSTN. Most modern networks also offer a variety of text and data services, although for ease of discussion, the example here focuses mainly on voice service calls.

The carrier operating the network 13 will also offer in-home or customer premises services via femto cell equipment. The carrier may lease or sell the equipment to any number of its customers in the area served by the macro network 13. Hence, the illustration shows several homes or other premises having base transceiver system (BTS) equipment for femto cells 23. Such a device includes a base transceiver system (BTS) for radio communications and an associated controller function, here again referred to as a base station controller (BSC) for convenience. Although non-IP type devices could be used, the exemplary femto cell BTS equipment comprises an IP-BTS, in that the BTS has an associated IP interface for communication via a packet data network such as the Internet. A number of vendors have recently demonstrated and/or begun offering to sell IP-BTS femto cell equipment. An example of a CDMA implementation of an IP-BTS is the UbiCell product by Samsung.

The transceiver of the femto cell BTS and the associated BSC are generally similar to those used in a public network, although the femto cell versions are scaled down for customer premises use. In many instances, the femto cell coverage area is approximately the size of a residential customer premises or the like. Over the airlink, the BTS will appear identical to a public or macro network BTS, except for the power level and possibly the particular one of the licensed frequency bands on which the macro and femto BTSs operate. The operational frequencies are discussed in more detail, later.

Since the mobile stations and the interfaces/protocols used over the airlink are the same as used in the macro network, the communications may not be compatible with direct IP transport. Hence, the exemplary IP-BTS also includes one or more interworking or protocol conversion functions for voice and/or data. For voice, for example, the IP-BTS will provide two-way conversions between the voice data format used by the mobile stations and BTSs and a Voice over IP (VoIP) packet format. Associated data communications will carry signaling information, e.g. in session initiation protocol (SIP), for the voice calls.

Figure 2:
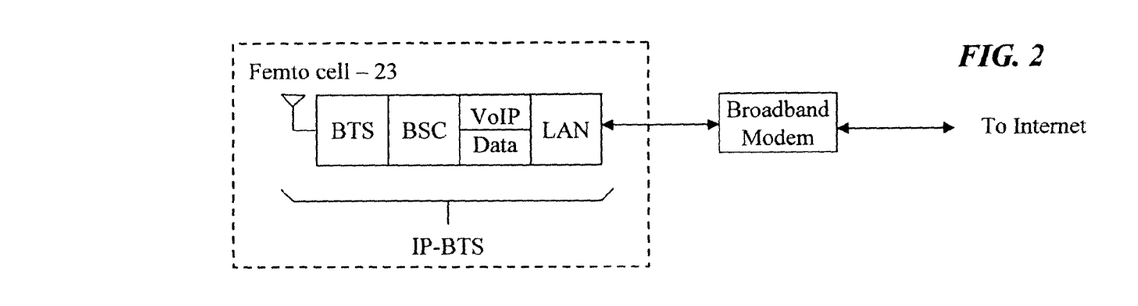
FIG. 2 is a simplified functional block diagram of customer premises equipment used in the system of FIG. 1, including an IP-BTS used to implement a customer premises femto cell.

The IP-BTS further includes a packet communication interface. Although other arrangements or interface types are possible, the example uses a local area network (LAN) interface, for providing packet communication with the customer's broadband modem. The modem, for example, may be a digital subscriber line (DSL) or cable modem. The present concepts also encompass arrangements that utilize wireless or fiber transport for IP packet services. Through the modem, the LAN interface provides two-way IP packet communication (e.g. for VoIP) with a wide area packet data communication network, for the mobile communications through the IP-BTS. In the example of FIGS. 1 and 2, the wide area network is the public Internet 25, although private networks may be used.

In general, each femto cell BTS is capable of operating on a selected one or more of a number of frequency channels. The present access strategy introduces the concept of a primary channel in the femto cell frequency band. Hence, the BSC functionality configures the femto cell BTS to provide at least a pilot on one of the channels designated as the primary channel for femto cell operations in the region of the macro network 13. As discussed more later, the carrier configures each of the mobile stations 11 to search the primary channel for a signal from a femto cell BTS, to facilitate network discovery based on PRL and/or idle state handoff of mobile stations 11 from base stations 15 of the macro network 13 to neighboring IP-BTSs of the femto cells 23.

Returning to the discussion of the overall system 10 of FIG. 1, each customer premises having a femto cell 23 will have a link to a packet data network, in this example the Internet 25 (provided by a broadband modem or the like as shown in FIG. 2). To manage wireless calls via the femto cells 23, the carrier will also operate a server or other platform 27 providing a soft switch functionality. The wireless soft switch 27 will appear as another mobile switching center to the MSC 21, e.g. via appropriate signaling and traffic communication links commonly used among MSCs. However, the wireless soft switch 27 communicates with the femto cells via IP packet transport through the Internet 25. To facilitate such communications, the carrier may also operate a gateway 29, to provide security between the public Internet 25 and the carrier's own private IP facilities, including the wireless soft switch 27.

The soft switch 27 controls at least some operations of the BTS equipment of the femto cells 23. The soft switch provides call processing functions, on calls via the femto cells. The soft switch or an associated management platform (not shown) may also control some or all of the configuration settings of the IP-BTS equipment.

There are several wireless operation parameters that are used in base station operations and associated mobile station searches and/or registrations that are involved in the femto cell access strategy under consideration here. Examples include frequency band, frequency channel(s) within the band, CDMA codes such as PN codes as may be used for pilot and/or traffic channels, and system identification information such as SID/NID. The present access strategy addresses this provisioning of such parameters for femto cell operations in a manner that supports seamless mobile station operation. A discussion of these parameters follows.

The frequency band may be determined based on the particular type of IP-BTS equipment, e.g. a carrier's choice to use equipment that operates in a specific band. A wireless or mobile service provider or "carrier" operates a public macro network, which may serve an entire country, e.g. the USA. The FCC has designated two cellular bands (A and B) and 4 PCS bands for mobile/wireless communication services in the United States. National carriers, such as Verizon Wireless, have obtained licenses to operate on one of these bands, at least in most major markets throughout the country. At least within a particular geographic region, say a metropolitan area, a carrier's macro network operates on an assigned one of the frequency bands. Other providers may offer competing services on one or more of the other bands. Hence, in our example, the macro network 13 of a carrier will operate in a frequency band licensed to the carrier for operation within a particular geographic service area. For purposes of several specific examples, we will assume that the macro network 13 operates in the A band or the B band.

The carrier will market femto-cell equipment 23, typically an IP-BTS (see FIG. 2), for customers to install in their homes, offices or the like. The IP-BTS for a femto cell 23 will also operate in one the bands designated for licensed public/macro network operations. The band could be the same as that of the carrier that is selling/leasing the femto cell equipment to its customers, although the femto cell band may be different from that of the carrier's macro cell network 13. For purposes of discussion of an example of the IP-BTS for a femto cell, it will be assumed that the femto cell BTS is a CDMA type device operating on one of the PCS bands.

To solve the RF Channel assignment issue, we introduce the notion of a primary channel, which all femto IP-BTSs will use as a reference. Conveniently, in the example, the primary channel is chosen to be the first channel of any macro network band adopted for femto cell operation. This primary channel is deterministic and is specified in the preferred roaming list (PRL) which is used by the mobile stations for network discovery and can be used in neighbor list messages used to direct idle state mobile station handoff. This primary channel can be at any band (A or B) for a dual-band market or on a licensed PCS band. The selection of such a channel is dependent upon the femto IP-BTS' capabilities. In our example, the femto BTS is a PCS only type IP-BTS, therefore, the primary channel to be chosen is the primary PCS channel for any given market. Hence, it will be the first PCS voice channel of any dual-band or PCS-only market.

Figure 3:
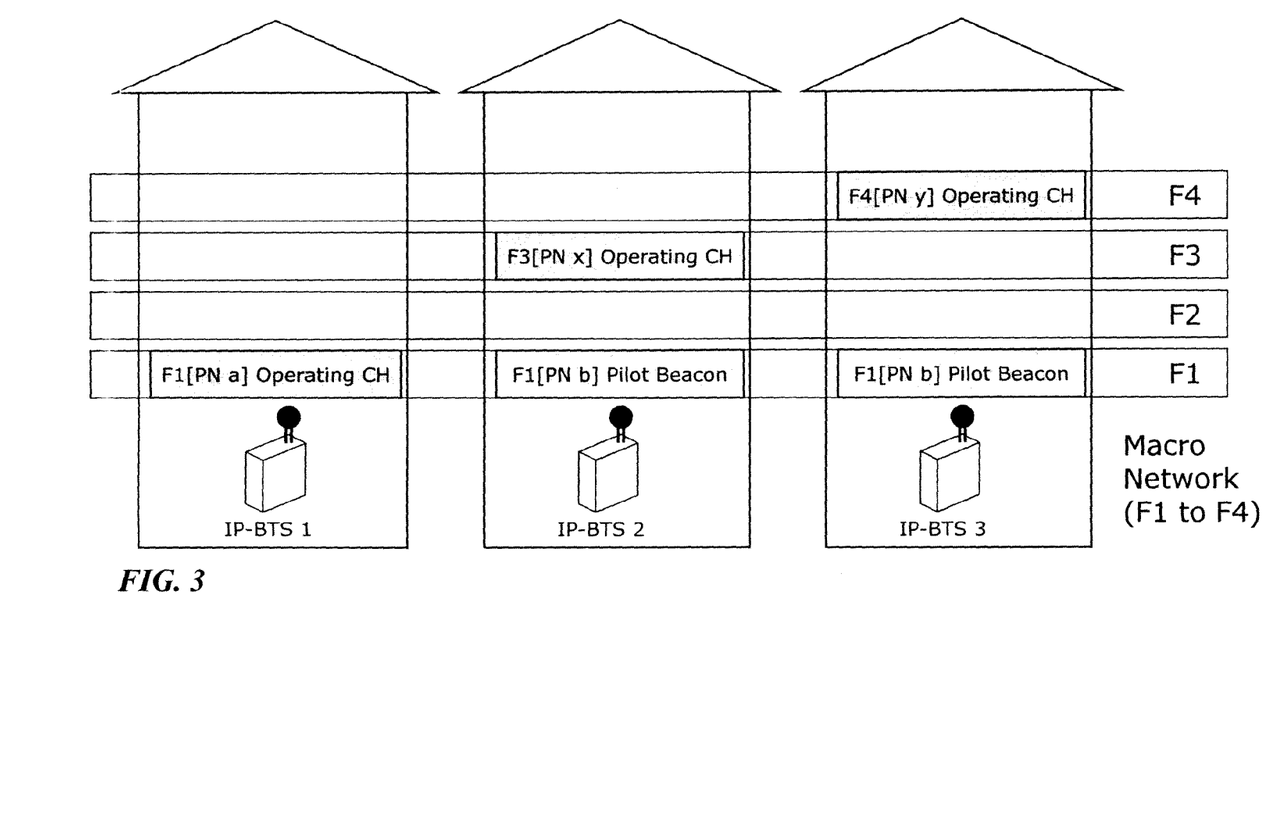
FIG. 3 is a diagram illustrating frequency and PN code use in several femto cells (via several IP-BTSs).

In the example of FIGS. 1-3, the carrier operates the base stations 15 of its macro network 13 on one of the two cellular bands (A and B). The exemplary femto BTS operates on one of the PCS bands. Within that PCS band, the IP-BTS can communicate on four contiguous CDMA carriers (frequency channels). For discussion purposes here, the CDMA carriers (frequency channels) are referred to as frequencies F1 to F4 (see FIG. 3). Since the PCS band is a band licensed for macro network use, the carriers F1 to F4 are in a macro network frequency band. However, in an example where the carrier's network 13 uses one of the two cellular bands (A or B), the carriers F1 to F4 are not in the same band as the network 13 of the carrier that may be distributing the femto cell equipment to its customers.

A pseudorandom noise (PN) code is a time offset of a chip sequence used for direct sequence spread spectrum processing of a digital transmission channel. The PN offset uniquely identifies a logical channel or communication, such as a pilot or communication traffic channel. PN codes are used in this manner by base stations 15 of the macro network 13, and PN codes will be used in an analogous manner for femto cell IP-BTS operations in this discussion.

As taught here, one of the femto cell frequency channels (F1 to F4 in the example) is designated as a "primary channel," which refers to the first frequency channel the mobile station scans/searches in the band used by the femto cells as per the instruction of a preferred roaming list (PRL), and that channel can also be used as part of a search operation based on a neighbor list message used to direct idle state handoff. System identification information is used for network discovery, e.g. when searching using the PRL. Such an operation is discussed in detail later. First we consider PN code assignment for neighbor searching, e.g. for handoff. When a mobile station searches a designated channel for a neighbor cell, e.g. in response to a neighbor list message, it looks for a pilot using a PN code identified in the message. To take advantage of this mechanism for handoff to femto cells, the neighbor list message identifies the femto primary channel and one or more PN codes expected to be used by a femto cell on that channel.

Hence, one or more PN codes are assigned for femto cell operation on the primary channel. A single PN code could be used for all IP-BTSs to operate a pilot at the primary operating frequency channel. In the example, the IP-BTS may provide service on the primary channel, or the pilot on the primary channel may direct the mobile station to another of the frequency channels F1 to F4 on which the particular IP-BTS is configured to provide service. Hence, two PN codes are assigned for femto cell operations. An IP-BTS can operate in any frequency channel within the band, given a pilot beacon is available at the primary frequency channel using the unified PN. One of the reserved PN codes (PNa) is used for an actual traffic operation on the primary frequency channel, and a second one of the reserved PN codes (PNb) is used for pilot only operation on the primary frequency channel. The IP-BTS (alone or in concert with its controlling soft switch) can arbitrarily select a PN code (e.g. PNx or PNy) for its traffic communication in situations where the IP-BTS opts to implement its traffic channel communications on a frequency channel other than the primary frequency channel.

This approach facilitates initial configuration/provisioning of the IP-BTS, as all such devices in a given region are set-up in the same manner to produce at least a pilot on the primary frequency channel F1. In an example that allocates two PN codes for primary channel usage, all of the IP-BTS devices are programmed with the same pair of codes and an algorithm to automatically select one of the codes for use on the primary channel, designated as codes PNa and PNb in the example of FIG. 3. Each IP-BTS can run an algorithm to pick the channel F1 to F4 that exhibits the best operational characteristics (e.g. lowest noise or interference) for actual mobile station traffic communications. If the IP-BTS picks the primary channel, say F1, for its regular communication channel, then it will use a first PN code (PNa in FIG. 3) for its operations on that channel F1. However, if the IP-BTS picks a different channel F2 to F4 for its regular communication channel, then it will only provide a pilot on the primary channel F1 in our example; and such an IP-BTS will use a second PN code (PNb in FIG. 3) for its operations on the primary channel F1.

In the example, one or more otherwise unused PN codes of the macro network 13 are reserved for the IP-BTSs in a region, e.g. for operations on a primary one of the frequency channels within the band. Hence, the IP-BTSs in the region all use one reserved Pseudorandom Noise (PN) code for a pilot on the primary frequency channel; and the IP-BTSs in the region all use a second reserved PN code for traffic communication if conducted on the primary frequency channel. In this manner, only two PN codes are reserved for all femto cell operations, which results in a very simple PN provisioning for the femto cells and attendant simple provisioning of the macro network 15 to facilitate idle state handoff to the femto cells 23.

The primary frequency channel assignment facilitates both idle state handoff and network discovery, e.g. for initial registration operations after a power-up or a loss of system signal. The mobile station idle state refers to a state when, after the mobile station 11 has searched for and found a wireless network system, all system information has been obtained, and overhead messages have been received from a base station through the paging channel, but the mobile station is not actively engaged in a call or data communication session. As discussed in more detail below relative to FIGS. 4-6, an idle state handoff is facilitated by communication of certain overhead messages from the base stations 15 of the macro network, which contain the frequency and PN code information discussed above. Network discovery involves additional assigned parameters.

Identifiers also are assigned to femto cell operations, in a format compatible with existing macro network operations, and in accord with the present example, that assignment is selected to facilitate seamless mobile station operations with minimal provisioning or configuration requirements. For CDMA type macro networks, base stations 15 of a carrier's macro network 13 are identified by a combination of system identifier (SID) and network identifier (NID). A mobile station 11 utilizes a preferred roaming list (PRL) in its processing to select among available wireless communication systems, typically those of multiple service providers that may operate in various areas through which the user of the mobile station roams. Deployment of femto cells 23, in the present examples, also addresses issues regarding SID/NID assignment for such network discovery.

In the example, the base stations 15 of the carrier's macro network 13 will have an assigned SID and one or more assigned NIDs. The IP-BTS equipment of the femto cells 23, supplied to the carrier's customers, will use the same SID as the macro network 13. The IP-BTS equipment of the femto cells 23 in the particular region is assigned a dedicated NID to facilitate registration. All of the femto cells 23 in the region may utilize the same NID. The NID may be the same as that of the regional macro network, or it may be an assigned NID. Hence, the system table of the carrier's PRL loaded and stored in the mobile stations 11 will include an entry of the SID/NID data of the IP-BTS equipment of the femto cells 23. That system table entry will include a pointer to a listing in the acquisition table, which will include the band, frequency and mode for the femto cell operations.

The IP-BTSs operate in one of the bands typically licensed for macro network usage. In most deployments, the acquisition data for the femto cell primary channel is the same as for a macro network that might operate within the same band, although that channel and/or band may be different from those of the carrier's own macro network 13 in the particular region. As noted earlier, the IP-BTS used in the example operates in one of the PCS bands and is capable of operating four frequency channels within that macro band. Within the band, the IP-BTS operates in a standard CDMA mode. One of the four frequency channels within the appropriate band is designated as the primary channel for the carrier's femto cell operations in the region as outlined above. Hence, the PRL acquisition table entry for the IP-BTS typically is one of those already existing for a macro network on the same band, e.g. a PCS system using the same band and primary channel in the example.

In most instances, the acquisition table entry will be the same as one of the typical macro network entries, because the IP-BTS uses a primary frequency in one of the cellular or PCS bands used by various macro networks. In a given region where the carrier operates, however, the femto cells may not operate on the same band or frequency as the regional macro network 13, therefore the system table entry for the femto cell system(s) may point to a different acquisition table entry.

As noted above, the parameter assignment for facilitating access to femto cell BTS equipment encompasses parameters used for both idle state handoff and for network discovery. It may be helpful to discuss examples in somewhat more details. In that regard, consider first the assignment of and communication of parameters such as primary channel frequency and PN codes as used to support idle state handoff.

Having discussed the parameter assignment, it may be helpful now to consider how the femto cell parameters are used in procedures to access femto cells. We will first consider searching for neighbor cells, e.g. for idle state handoff.

Modern cellular networks utilize a number of neighbor list messages to assist mobile stations in various handoff situations. Examples of such messages include a general neighbor list message (GNLM), an extended neighbor list message (ENLM), and a universal neighbor list message (UNLM). Although other neighbor list messages could be used, the example uses the GNLM to support the femto cell deployment. Hence in our example, the data in the GNLM message broadcast by the BTSs 17 of the macro network 13 includes data related to the IP-BTS to facilitate idle state handoff from the macro network 13 to a femto cell 23.

Figure 4:
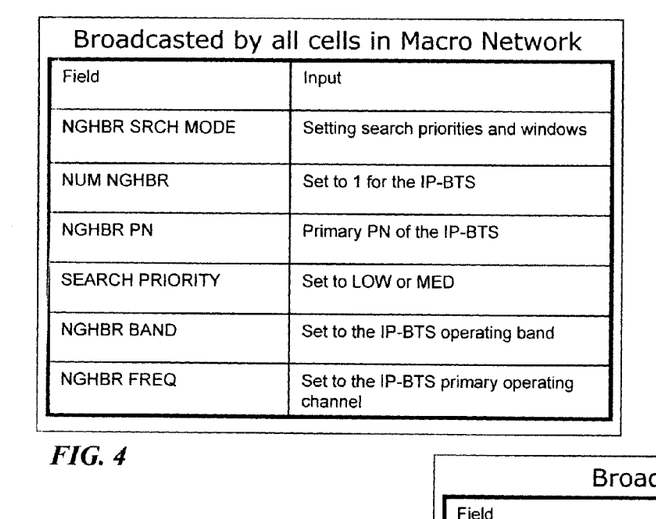
FIG. 4 depicts exemplary elements of a general neighbor list message (GNLM) transmitted from a macro network base station.
Figure 5:
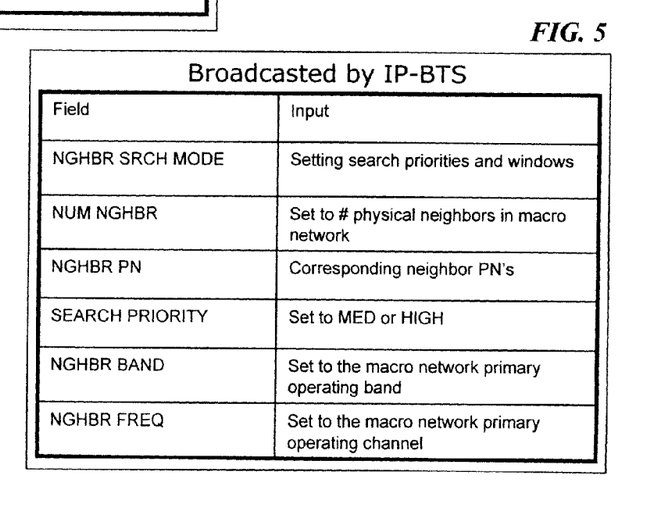
FIG. 5 depicts exemplary elements of a GNLM transmitted from an IP-BTS of a femto cell.

FIGS. 4 and 5 show examples of data that may be contained in GNLM messages. The table in FIG. 4 shows data from a GNLM broadcast by a macro network base station 15, whereas FIG. 5 shows data from a GNLM broadcast by an IP-BTS of a femto cell 23. For example, the GNLM broadcast by a macro network base station 15 (FIG. 4) contains an identification of the operating frequency band for the IP-BTS, an identification of the primary frequency channel within that band used for femto cell operations and one or more PN codes assigned for femto cell use on the primary channel. Although not shown, at least in system border cells of the macro network 13, the GNLM messages broadcast from the base stations 15 will include similar information for neighboring macro cells in a normal manner.

To solve the dynamic neighbor list population and update issue for femto cell deployment, we therefore use the method of pre-populating all neighbor lists of the network 13 with entries of the reserved PN(s) and data indicating the primary channel (from the parameter assignment discussed earlier). Since these entries are band and channel specific, the example employs the General Neighbor List Message (GNLM) as specified in the IS-2000 standard. Effectively, we make the femto IP-BTS devices potential neighbors for any macro BTS 17 throughout the network 13. Hence, these femto cell devices can be deployed in any location within the macro network region, with only minimal changes to neighbor list data that is broadcast from the base stations 15 to support the femto cell deployment.

Functionally, all 3G mobiles, in the idle state, will receive the GNLM and be directed to continually scan for the presence of these femto IP-BTS devices at the specified channel with one of the specified PNs as a potential neighbor. Hence, any idling mobile stations 11, when the RF conditions are met, will be able to discover and seamlessly move from the macro network 13 onto and register at these femto IP-BTS devices.

Typically, a mobile station 11 measures the pilot signal strength of a serving base station, and it monitors the pilot signal strengths of the neighbor cells. Based on relative strengths, the mobile station decides to implement an idle handoff, e.g. to a neighbor base station having a better pilot signal strength in accord with the applicable handoff algorithm. In response to such a decision, the mobile station 11 will lock onto the paging channel of the selected base station having the greater pilot signal strength and begin obtaining information from that channel needed to register with and communicate through the base station.

For idle handoff, 3G mobile stations support use of the GNLM to allow the mobile stations to search for neighbor pilots on a different band or frequency. For the femto cell deployment, GNLM message transmissions as outlined above will facilitate idle handoff between a macro base station 15 and an IP-BTS of a femto cell 23. As noted, 3G mobile stations support use of GNLM; however, that message is not supported by 2G mobile stations. 2G mobile stations could switch between the macro network and femto cell through loss of pilot and return to a PRL based network discovery (such as one discussed in more detail later).

The 3G mobile station 11 scans for macro network neighbors, in essentially the normal manner. However, the scan for neighbors includes scanning for femto cell neighbors, based on the femto cell data included in the GNLM. When the mobile station 11 detects a femto cell signal on the primary frequency, and the normal neighbor handoff criteria are met (e.g. relative signal strength criteria), then the mobile station 11 performs an idle handoff to the primary frequency channel F1 of the femto cell 23, based on the frequency and PN code. If that channel is pilot only (not the actual traffic channel), then the mobile station 11 obtains data from the pilot to perform a hash to the designated frequency channel for traffic (within the same band). By using a frequency and PN codes for the IP-BTS, the mobile stations 11 therefore can find and communicate with an IP-BTS in exactly the same manner as with a macro network base station. To a mobile station, the IP-BTS looks like just another neighbor base station.

Figure 6:
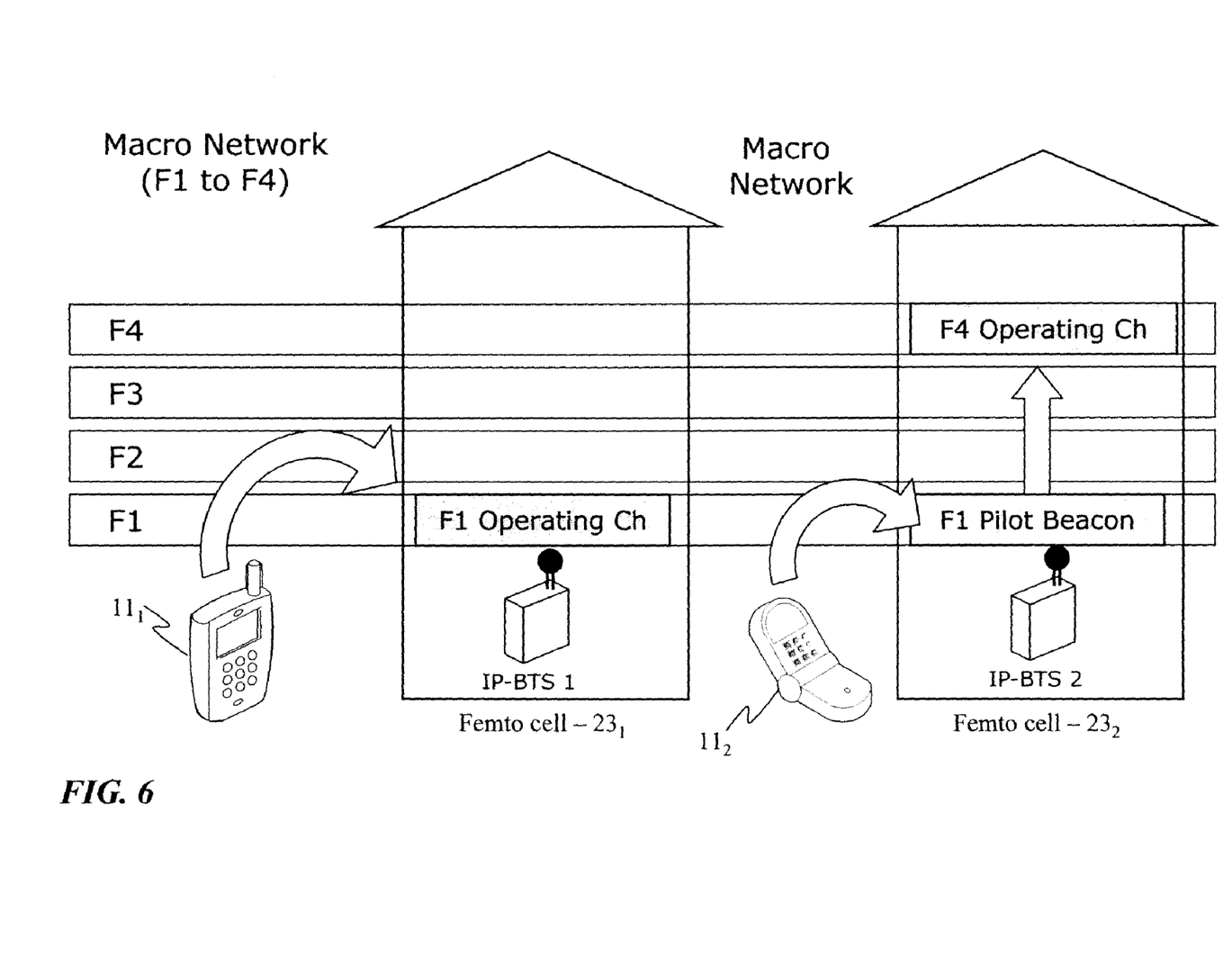
FIG. 6 is a diagram illustrating two idle state mobile station handoff scenarios, from the macro network to femto cells.

In that regard, it may be helpful to consider the examples of FIG. 6. For discussion purposes, two mobile stations $11_1$ and $11_2$ receive GNLM messages containing primary frequency data for primary channel F1 and the two PN codes, for the operations of femto cells 23 in the relevant area. The femto cell $23_1$ provides actual traffic operations on the primary channel F1, using the first PN code PNa. The femto cell $23_2$ provides only a pilot beacon on the primary channel F1 using the second PN code PNb. The femto cell $23_2$ provides actual traffic operations on another channel, F4 in this example, but the pilot beacon on the primary channel F1 provides information indicating the frequency channel F4 for actual traffic operations.

A first mobile station $11_1$ measures the pilot signal strength of a serving base station, and it monitors the pilot signal strengths of one or more neighbor cells. Based on relative strengths, the mobile station $11_1$ decides to implement an idle handoff, e.g. to a neighbor base station having a better pilot signal strength in accord with the applicable handoff algorithm. In the example of mobile station $11_1$, the neighbor search includes the primary frequency F1; and the mobile station $11_1$ detects the traffic operations using PN code PNa on that frequency channel. When the signals meet criteria for handoff to femto cell 23, the mobile station $11_1$ will lock onto the paging channel of the selected IP-BTS of femto cell $23_1$ in channel F1 and initiate an idle station handoff to that IP-BTS.

In a similar fashion, a second mobile station $11_2$ measures the pilot signal strength of various base stations including those of the femto cell $23_2$ on primary channel F1. Upon detecting that the relative strengths (or other parameters) meet the applicable handoff criteria, the mobile station $11_2$ decides to implement an idle handoff to the neighboring base station in accord with the applicable handoff algorithm. In the example of mobile station $11_2$, the neighbor search includes the primary frequency F1; and the mobile station $11_2$ detects the traffic operations using PN code PNb on that frequency channel. Hence, when the handoff criteria are met, the mobile station $11_2$ will access the pilot beacon of the selected IP-BTS of femto cell $23_2$. From the pilot beacon, the mobile station $11_2$ obtains the data necessary to perform a hash to the designated frequency channel F4 used for traffic communications by the IP-BTS of the femto cell $23_2$. The mobile station $11_2$ will lock onto the paging channel of the selected IP-BTS of femto cell $23_2$ in channel F4 and initiate an idle station handoff to that IP-BTS.

As shown by the examples, each mobile station 11 receives neighbor list messages and scans for network neighbors, in essentially the normal manner. The femto cells 23 can be found just like neighboring macro cells. By using a frequency and PN codes for the IP-BTS, the mobile stations can find and communicate with an IP-BTS in exactly the same manner as with a neighbor macro network base station 15. To a mobile station 11, the IP-BTS of a femto cell 23 looks like just another neighboring base station; and idle state handoff can be handled in a seamless manner, typically without notice by or any inconvenience to the mobile station user. Yet the provisioning for this access strategy is quite manageable.

Another of the exemplary strategies for finding and accessing IP-BTS equipment based on a primary channel allocation for the femto cells 23 utilizes the PRL for network discovery, for example after power-up or to find a new system after a complete loss of system signal by the mobile station. Before discussing the femto cell application, it may help first to consider general aspects of a PRL and the associated mobile station processing for network discovery based on a PRL in somewhat more detail.

A PRL enables a mobile station 11 to select preferred wireless communication service providers/networks, including for various types of services such as voice calls, data communications and SMS services. The PRL list identifies various systems in different services areas and for an area in which two or more systems are identified in the list, the PRL also indicates a preferred order of use. The customer typically subscribes to service with a home service provider. The identified systems in a given area may include a system of the customer's home wireless service provider and/or systems of other service providers with whom the home service provider has negotiated favorable roaming agreements, that is to say having a favorable affiliation or 'partner' arrangement with the home service provider. The PRL also provides a mechanism by which mobile stations can search for femto cells. For purposes of this discussion, we will assume that the base station 15 and the MSC 21 of the carrier are wireless facilities of the most preferred service provider identified in the PRL of the mobile station 11 for the particular region, whereas the femto cells are the next most preferred facilities identified in the PRL of the mobile station 11. Of course, this preference could be reversed or the PRL could specify other preferences for the particular area.

Hence, each mobile station 11 stores a copy of the PRL, for controlling a network discovery search for service. The mobile station 11 uses the PRL, for example, when it is turned ON (transition from an OFF state) or after it has lost network service. The PRL list specifies frequencies to search, and in CDMA systems, the PRL list specifies identification information to search for on the specified frequencies.

A typical PRL used in CDMA type systems and mobile stations includes an acquisition table listing the acquisition parameters (including band, frequency and mode) to allow the device to search the airwaves for systems preferred by the carrier. Such a PRL also includes a system table listing system identifiers (SIDs) and associated network identifiers (NIDs) as the identification information of various systems the mobile station may encounter during roaming. The system table also may indicate whether a particular SID/NID pair identifies a system that a mobile station is allowed to access or identifies a system that the carrier's mobile stations are not allowed to access. Many systems use the same operating parameters, and thus access to such systems can use a common set of acquisition parameters. Hence, the system table also includes a pointer to the acquisition table indicating the line in the acquisition table listing the acquisition parameters of the system identified by each SID/NID pair. When a mobile station searches using the PRL, it essentially goes through entries in the system table in order until it finds the first system identified by a SID/NID pair in the table that it is permitted to access. As it is going through the system table, for each entry, the mobile station uses the data in the appropriate line of the acquisition table (indicated by the pointer) to search the appropriate band and frequency and to look for appropriate operational mode signals (e.g. CDMA). When it finds the first listed system (most preferred available), the mobile station 11 initiates a procedure to register with that system.

As noted, earlier, base stations 15 of the carrier's macro network 13 have an assigned SID and one or more assigned NIDs. The IP-BTS equipment of the femto cells 23, supplied to the carrier's customers, will use the same SID. The IP-BTS equipment of the femto cells 23 in the particular region also uses a NID, which may be a NID of the macro network or a dedicated NID. The system table of the carrier's PRL loaded and stored in the mobile stations 11 will include an entry of the SID/NID data of the IP-BTS equipment of the femto cells 23. If the SID/NID pair is the same as an entry for a macro network, then there need not even be an additional entry in the table, as the SID/NID entry will be that for the corresponding macro network. That system table entry will include a pointer to a listing in the acquisition table, which will include the band, frequency and mode for the femto cell operations. If femto cells operate on a frequency used by a macro network, the femto cells can use the same SID/NID pair data. If the femto cells operate on a frequency other than one of those used by the macro networks otherwise identified in the PRL, then the SID could be the same, but the NID would be different, so that he SID/NID entry could point to an appropriate listing in the acquisition table.

The IP-BTSs operate in one of the bands typically licensed for macro network usage. In most deployments, the acquisition data for the femto cell primary channel is the same as for a macro network that might operate within the same band, although that channel and/or band may be different from those of the carrier's own macro network 13 in the region. Hence, the PRL acquisition table entry for the IP-BTS typically is one of those already existing for a macro network on the same band. In the example, the acquisition data identifies the appropriate PCS band and the channel thereof designated as the primary channel. The IP-BTS operates in a standard CDMA mode.

In this way, the mobile stations 11 will scan for the IP-BTSs as part of their otherwise normal PRL system discover operations, in exactly the same way that they search for the base stations 15 of the macro network 13. A mobile station 11 will detect and register with a femto cell 23 if the femto cell is the first listed system that the mobile system detects in a PRL search operation.

Since the primary channel is deterministic and is specified in the PRL, there is no need to introduce any special PRL's to support the product. Hence, no modification of customer devices is required. At most, data is added to the PRL similar to adding data for another preferred system.

The PRL can be pre-stored, e.g. during manufacture or upon initialization when the mobile station is sold or delivered to the user. Today, most mobile stations and wireless communications networks are configured to allow downloading of the PRL over the air, for storage in the mobile stations. This simplifies initial provisioning of the mobile stations and allows the carrier to periodically update the PRL with the latest relevant data, e.g. to add any data needed to find femto cells to the PRL in existing mobile stations.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Appendix: Acronym List

The description above has used a large number of acronyms to refer to various services, messages and system components. Although generally known, use of several of these acronyms is not strictly standardized. For the convenience of the reader, the following list correlates terms to acronyms, as used in the detailed description above.

BS—Base Station
BSC—Base Station Controller
BTS—Base Transceiver System
CDMA—Code Division Multiple Access
DSL—Digital Subscriber Line
ENLM—Extended Neighbor List Message
GNLM—General Neighbor List Message
IP—Internet Protocol
IP-BTS—Internet Protocol—Base Transceiver System
ISP—Internet Service Provider
MS—Mobile Station
MSC—Mobile Switching Center
NID—Network IDentifier PBX—Private Branch Exchange
PCS—Personal Communication Service
PN—Pseudorandom Noise
PRL—Preferred Roaming List
PSTN—Public Switched Telephone Network
RF—Radio Frequency
SID—System Identifier
SIP—Session Initiation Protocol
UNLM—Universal Neighbor List Message
VoIP—Voice over Internet Protocol

What is claimed is:

1. A method comprising:
storing a preferred roaming list (PRL) of a carrier in a mobile station operable through base stations of a macro wireless communication network operated by the carrier and through a plurality of customer premises femto cells, the PRL including one or more entries providing information for use in searching for and selecting a femto cell base transceiver system (BTS) and one or more entries providing information for use in searching for and selecting a macro network base station, in a network discovery operation, wherein:
each femto cell is capable of operating on a selected one or more of a plurality of frequency channels, and each femto cell is configured to provide at least a pilot on one of the frequency channels designated as a primary frequency channel for femto cell communication, and
the information for use in searching for and selecting a femto cell includes an identification of the primary frequency channel for femto cell communication and system identification information to be used by the BTSs of all femto cell BTSs of the carrier's customers communicating on the primary frequency channel;
upon initiating network discovery, searching for a system with which to register the mobile station based on the stored PRL, the search including searching for the system identification information on the primary frequency channel; and
initiating a procedure to register the mobile station with one of the femto cell BTSs, responsive to the search detecting the system identification information on the primary frequency channel.

2. The method of claim 1, wherein the identification of the primary frequency channel identifies a designated one of a plurality of frequency channels of a frequency band assigned for mobile communications via a macro network.

3. The method of claim 1, wherein the system identification information comprises a system identifier (SID) to be used by the BTSs of the femto cells and a network identifier (NID) to be used by the BTSs of the femto cells.

4. The method of claim 1, wherein the SID to be used by the BTSs of the femto cells is a SID used by the base stations of the macro network operated by the carrier.

5. The method of claim 4, wherein the NID to be used by the BTSs of the femto cells is a NID assigned to the BTSs of the femto cells to be operated in the region.

6. The method of claim 4, wherein the NID to be used by the BTSs of the femto cells is a NID used by the base stations of the macro network operated by the carrier.

7. A mobile station comprising:
a communication interface configured to enable the mobile station to operate through base stations of a macro wireless communication network operated by a carrier and through at least one of a plurality of customer premises femto cells,
wherein each femto cell is capable of operating on a selected one or more of a plurality of frequency channels, and each femto cell is configured to provide at least a pilot on one of the frequency channels designated as a primary frequency channel for femto cell communication;
a storage for storing a preferred roaming list (PRL), the PRL including one or more entries providing information for use in searching for and selecting a femto cell base transceiver system (BTS) and one or more entries providing information for use in searching for and selecting a macro network base station,
wherein the information for use in searching for and selecting a femto cell includes an identification of the primary channel for femto cell communication and system identification information for use by the BTSs of all femto cell BTSs of the carrier's customers communicating on the primary frequency channel; and
a processor configured to enable the mobile station to perform functions, including functions to:
store the PRL of the carrier in the storage in a network discovery operation;
upon initiating network discovery, search for a system with which to register the mobile station based on the stored PRL, the search including searching for the system identification information on the primary frequency channel; and
initiate a procedure to register the mobile station with one of the femto cell BTSs, responsive to the search detecting the system identification information on the primary frequency channel.

8. The mobile station of claim 7, wherein the identification of the primary frequency channel identifies a designated one of a plurality of frequency channels of a frequency band assigned for mobile communications via a macro network.

9. The mobile station of claim 7, wherein the system identification information comprises a system identifier (SID) for use by the BTSs of the femto cells and a network identifier (NID) for use by the BTSs of the femto cells.

10. The mobile station of claim 7, wherein the SID for use by the BTSs of the femto cells is a SID for use by the base stations of the macro network operated by the carrier.

11. The mobile station of claim 10, wherein the NID for use by the BTSs of the femto cells is a NID assigned to the BTSs of the femto cells operated in the region.

12. The mobile station of claim 10, wherein the NID for use by the BTSs of the femto cells is a NID for use by the base stations of the macro network operated by the carrier.

* * * * *